(12) United States Patent
Chang et al.

(10) Patent No.: US 8,072,841 B2
(45) Date of Patent: Dec. 6, 2011

(54) ADAPTIVE WAVEFRONT RECONSTRUCTION

(75) Inventors: Toshi Thomas Chang, Sugar Land, TX (US); Luis Canales, Houston, TX (US); Alfonso Gonzalez, Sugar Land, TX (US)

(73) Assignee: WesternGeco L.L.C., Houston, TX (US)

( * ) Notice: Subject to any disclaimer, the term of this patent is extended or adjusted under 35 U.S.C. 154(b) by 315 days.

(21) Appl. No.: 12/331,574

(22) Filed: Dec. 10, 2008

(65) Prior Publication Data

US 2010/0142322 A1    Jun. 10, 2010

(51) Int. Cl.
*G01V 1/28* (2006.01)
(52) U.S. Cl. .............. 367/73; 367/38; 367/21; 367/14
(58) Field of Classification Search ............. 367/21, 367/71, 73; 364/421; 702/16
See application file for complete search history.

(56) References Cited

U.S. PATENT DOCUMENTS

| | | |
|---|---|---|
| 5,189,626 A | 2/1993 | Colburn |
| 7,382,685 B2 | 6/2008 | Ferber et al. |
| 2002/0158869 A1 | 10/2002 | Ohba et al. |
| 2005/0207278 A1 | 9/2005 | Reshef et al. |

FOREIGN PATENT DOCUMENTS

| | | |
|---|---|---|
| GB | 2329043 A | 3/1999 |
| WO | 9810312 | 3/1998 |

OTHER PUBLICATIONS

Chang, et al, Forward Modeling Attribute Analysis for AVO and Prestack Depth Migration, SEG Conference, Oct. 2002.
Lecomte, et al, Efficient and Flexible Seismic Modeling of Reservoirs: A Hybrid Approach, The Leading Edge, May 2004, pp. 432-437, vol. 23, No. 5.
Moczo, et al, Hybrid Modeling of P-SV Seismic Motion at Inhomogeneous Viscoelastic, Bulletin of Seismological Society of America, Oct. 1997, pp. 1305-1327, vol. 87, No. 5.
PCT Search Report, dated Aug. 2, 2010, Application No. PCT/US2009/067462.

*Primary Examiner* — Jack Keith
*Assistant Examiner* — Daniel L Murphy

(57) ABSTRACT

A method for generating a synthetic seismogram. In one implementation, a ray tracing may be performed on a subsurface. The ray tracing may generate a plurality of rays. A first seismic wavefront may be reconstructed by triangulating a first plurality of control points that correspond to the plurality of rays. Each control point may represent an end point of a ray at the first seismic wavefront. The plurality of rays may be propagated to a second seismic wavefront. The second seismic wavefront may have a hole associated with at least one missing ray at the second seismic wavefront. A plurality of points on a circle may be defined that correspond to a second plurality of control points defining the hole. The second seismic wavefront may be reconstructed based on the plurality of points on the circle.

19 Claims, 9 Drawing Sheets

US 8,072,841 B2

ADAPTIVE WAVEFRONT RECONSTRUCTION

BACKGROUND

1. Field of the Invention

Implementations of various technologies described herein generally relate to methods and systems for generating synthetic seismograms.

2. Description of the Related Art

The following descriptions and examples are not admitted to be prior art by virtue of their inclusion within this section.

Seismic data signals are typically acquired by measuring and recording data during a seismic survey. A seismic survey may be performed by repeatedly firing an impulsive seismic energy source at the surface of the earth, sea or seafloor and recording the received signals at a set of receivers. The receivers may typically be situated at the same surface as the source, but laterally displaced on regular grid positions. However, there may be situations where a non-regular distribution of the receivers is preferred or where the source and the receivers may be positioned at different depth levels. In a typical seismic survey, the source and the receivers may be displaced at fixed intervals (e.g., 25 meters) and in a certain direction (e.g., the "inline" direction).

During the seismic survey, the cycle of firing the source and recording the received signals may be repeated a plurality of times. When firing the seismic source, a pressure wave may be excited and propagated into the subsurface. The pressure wave reflects off interfaces between various earth layers (such as, rock, sand, shale, and chalk layers) and propagates upwardly to the set of receivers, where the particle velocity of the wave vibrations or the pressure oscillations of the wave may be measured and recorded.

The strength of the reflected wave is proportional to the amount of change in elastic parameters, e.g., density, pressure velocity, and shear velocity, at the respective interfaces. Consequently, the data recorded by the receivers represents the elastic characteristics of the subsurface below the receivers.

The seismic survey provides a seismogram that can be used to model images of the subsurface. Images of the subsurface may be derived by determining a velocity model of the subsurface. The velocity model is determined within a recursive process that generates synthetic seismograms, and compares the synthetic seismograms to the seismogram from the survey. The velocity model is updated until the synthetic seismogram is similar to the actual survey seismogram.

The synthetic seismogram may be generated as numerous reconstructed wavefronts. The reconstructed wavefronts may be 3-dimensional models of the pressure wave as the pressure wave travels through the subsurface. Typically, the reconstructed wavefronts are modeled using polygon triangulation.

SUMMARY

Described herein are implementations of various technologies for a method for generating a synthetic seismogram. In one implementation, a ray tracing may be performed on a subsurface. The ray tracing may generate a plurality of rays. A first seismic wavefront may be reconstructed by triangulating a first plurality of control points that correspond to the plurality of rays. Each control point may represent an end point of a ray at the first seismic wavefront. The plurality of rays may be propagated to a second seismic wavefront. The second seismic wavefront may have a hole associated with at least one missing ray at the second seismic wavefront. A plurality of points on a circle may be defined that correspond to a second plurality of control points defining the hole. The second seismic wavefront may be reconstructed based on the plurality of points on the circle.

In another implementation, the first seismic wavefront may be reconstructed at a first time interval at which the plurality are propagated. Similarly, the second seismic wavefront may be reconstructed at a second time interval.

In another implementation, the plurality of points on the circle may be triangulated using Delaunay triangulation. The plurality of points may be equidistant along the circle. A plurality of triangles may be formed within the circle by the Delaunay triangulation. The plurality of triangles may be mapped to the hole.

In yet another implementation, a normal vector may be determined for each triangle of the hole. The normal vectors may be perpendicular to the surface of the triangles. Two adjacent triangles may be determined, and average vectors may be determined by averaging the normal vectors of the adjacent triangles. A portion of the plurality of control points may be triangulated based on the average vectors.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

Figure 1:
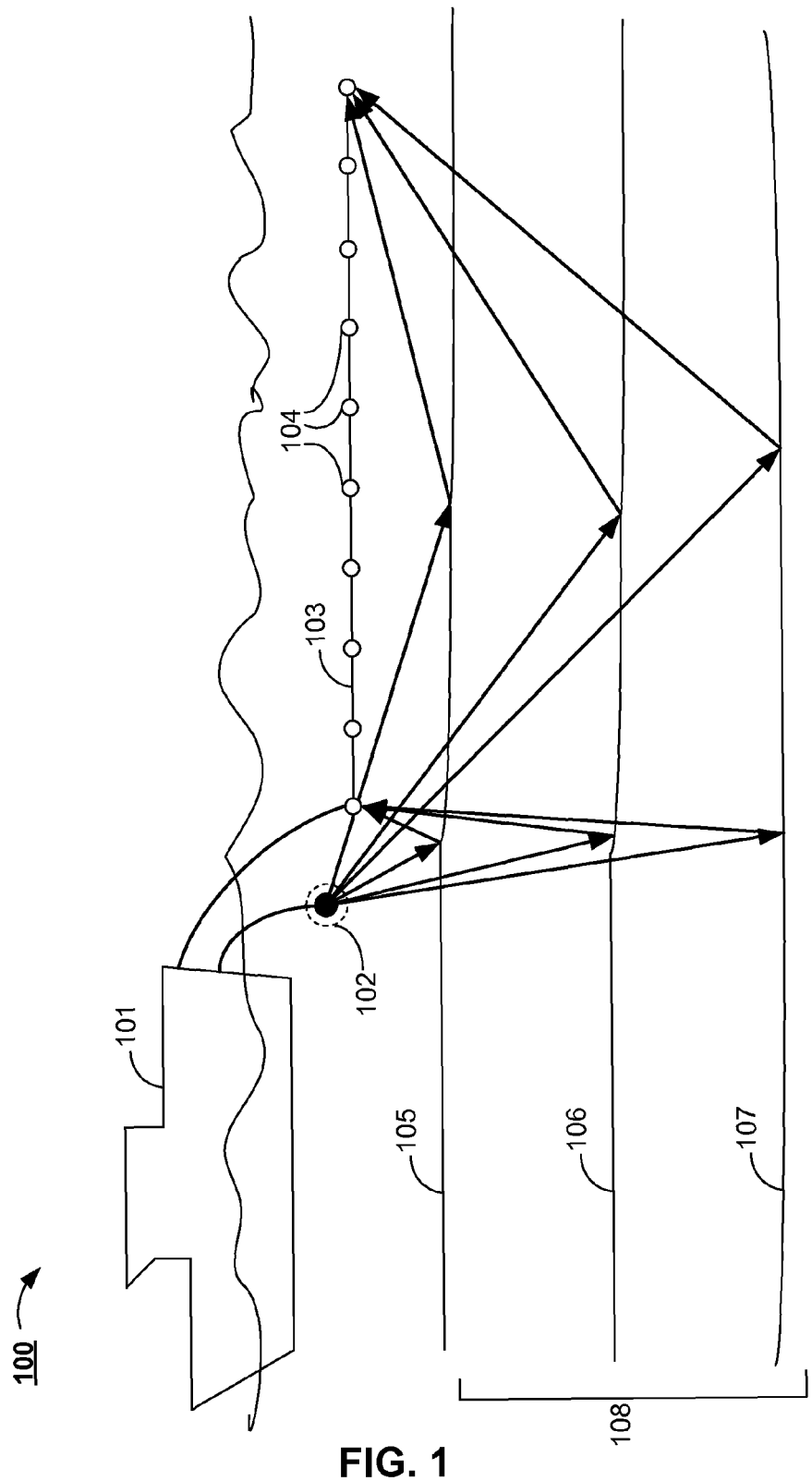
FIG. 1 illustrates a schematic diagram of a system for obtaining seismic data signals from a subsurface area in a marine environment in accordance with one or more implementations of various techniques described herein.

FIG. 1 illustrates a schematic diagram of a system 100 for obtaining seismic data signals from a subsurface area in a marine environment, in accordance with one or more implementations of various techniques described herein. It should be noted that the marine environment is merely one example of an environment for obtaining seismic data signals. Seismic data signals may also be obtained from other environments, such as land, deltas, and swamps.

In a marine environment, a seismic survey vessel 101 may be used to tow a seismic source, such as an airgun 102, and a plurality of seismic sensors/receivers 104 carried on streamers 103. Each streamer 103 may include a plurality of hydrophones 104 which sense acoustic impulses and transmit the seismic data signals, referred to as seismic traces, to the seismic survey vessel 101 where they are typically digitized and recorded. The airgun 102 produces a series of acoustic pulses, a portion of which are partially reflected by the sea bed 105 and a portion of which penetrate through the sea bed to a subsurface 108.

The subsurface 108 may include formation boundaries 106 and 107 between geological formations of the subsurface. The acoustic pulses that penetrate the subsurface 108 may be reflected by boundaries 106 and 107. The geological formations may include various formations, such as hydrocarbons, carbonate, sandstone, chalk, and salt. The various formations may have differing acoustic impedances.

The seismic data signals obtained in the system 100 may be used to generate a seismogram. A synthetic seismogram may also be generated by simulating the acoustic pulses on a velocity model of the subsurface 108. The velocity model may be an estimation of the formations in the subsurface 108.

By comparing the actual seismogram to the synthetic seismogram, the velocity model may be refined to be more representative of the actual subsurface 108. Further refinements of the velocity model may be obtained by iteratively generating synthetic seismograms on refined velocity models. By iteratively refining the velocity model, generating synthetic seismograms, and comparing the synthetic seismograms to the actual seismogram, the velocity models may be refined to more accurately represent the actual subsurface 108.

Figure 2:
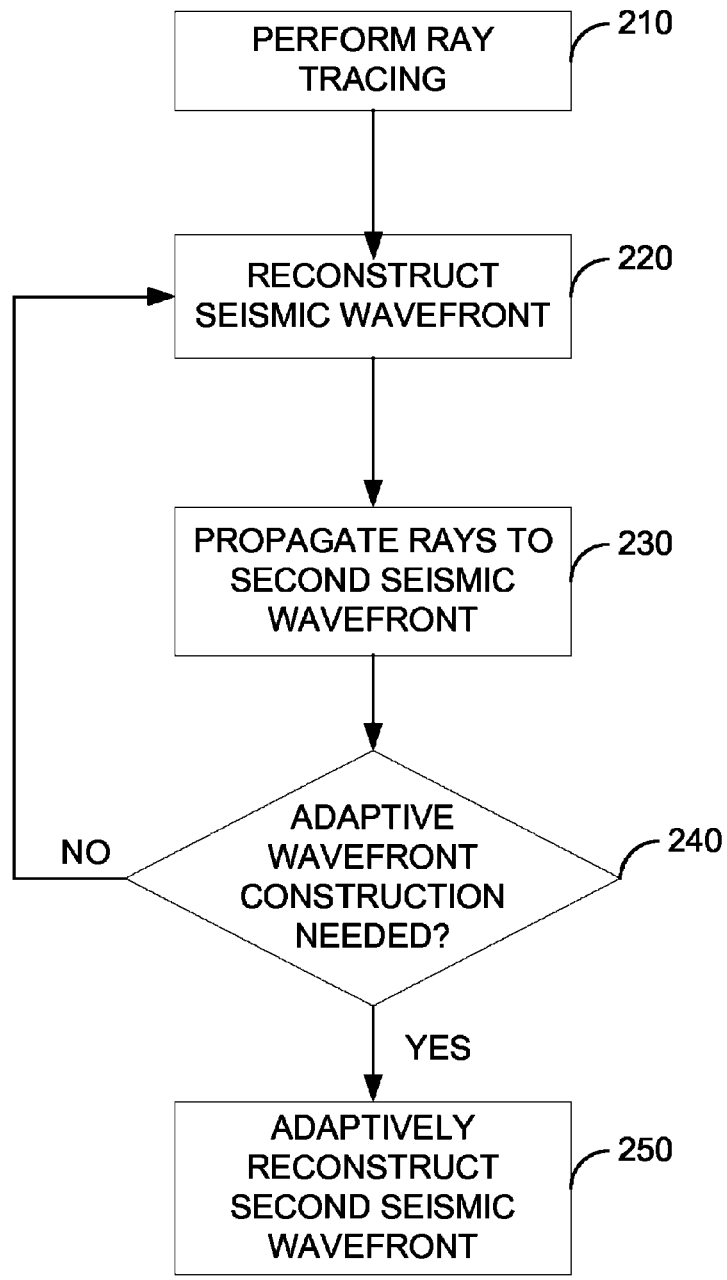
FIG. 2 illustrates a flowchart of a method for generating a synthetic seismogram according to implementations described herein.

FIG. 2 illustrates a flowchart of a method 200 for generating synthetic seismograms according to implementations described herein. It should be understood that while the operational flow diagram indicates a particular order of execution of the operations, in some implementations, certain portions of the operations might be executed in a different order.

The synthetic seismogram may be generated by reconstructing seismic wavefronts of the acoustic pulses at specific time intervals. The reconstructed seismic wavefronts may represent the acoustic pulse as the pulse travels through the subsurface 108.

At step 210, ray tracing may be performed on the subsurface 108. Ray tracing is a method for calculating the path of waves, such as acoustic pulses, through regions of varying propagation velocity, absorption characteristics, and reflecting surfaces. In ray tracing, the wavefront of the acoustic pulses may be represented using a number of rays. The rays may be propagated through the subsurface in specified time intervals. At a first time interval, the endpoint of each ray may extend to a point on the surface of a first seismic wavefront.

The endpoints of the rays at a specified time interval may also be referred to herein as control points. Each control point has the following characteristics: x, y, and z spatial coordinates, traveltime, amplitude, and energy.

At step 220, the wavefront may be reconstructed by triangulating the control points at the first time interval. In one implementation, the wavefront may be reconstructed by triangulating the control points using Delaunay triangulation.

In three-dimensional space, a Delaunay triangulation for a set of points is a triangulation such that no point is inside the circumscribed sphere of any other triangle. The circumscribed sphere is a sphere that contains the three points of any triangle in the triangulation. Delaunay triangulations may be used to maximize the minimum angle of all the angles of the triangles in the triangulation, and thus tend to avoid skinny triangles.

The Delaunay condition states that a triangulation is a Delaunay triangulation if all the circumscribed spheres of all the triangles in the triangulation are empty. The circumscribed sphere of a triangle is empty if it does not contain vertices other than the three vertices that define the triangle.

Each control point may also have the characteristics of amplitude and energy. Energy is a function of the amplitude of the control point, and amplitude is a function of the area of the triangles. Because the process of reconstructing wavefronts avoids triangles of zero area, amplitudes, and therefore, energy may be defined and total energy may be preserved. Energy preservation may be accomplished by both, the ray tracing process, which connects each control point in the existing wavefront to a point in the new wavefront; and the wavefront reconstruction process, which defines the areas of triangles in the new wavefront and maps areas of the existing wavefront to their corresponding areas in the new wavefront.

At step 230, the rays may be propagated to a second time interval. In other words, at the second time interval, the endpoints of the rays may extend to points on the surface of a second seismic wavefront.

At step 240, it may be determined whether adaptive wavefront construction is needed. Adaptive wavefront construction may be needed due to the behavior of the rays in the subsurface 108.

The rays may bend, change direction, or reflect off formations in the subsurface 108. As such, some of the rays may converge. In such a case, rays that converge within a specified threshold may be dropped from the wavefront reconstruction.

In some scenarios, rays may be completely reflected by formations in the subsurface 108. For example, a salt formation may completely reflect 99% of the rays that hit the formation.

Missing rays, either due to convergence or reflected rays, may create holes in the second seismic wavefront. Holes in the second seismic wavefront indicate gaps in the synthetic seismograms used for velocity modeling. Accordingly, gaps in the synthetic seismograms may create gaps in the velocity model. As such, if there are any missing rays, adaptive wavefront construction may be needed and method 200 may proceed to step 250. The rays may also diverge. In a scenario where the divergence exceeds a specified threshold, adaptive wavefront construction may also be needed. If adaptive wavefront construction is not needed, the method may return to step 220.

At step 250, the second seismic wavefront may be adaptively reconstructed. Adaptive wavefront reconstruction may reconstruct the second seismic wavefront with the available rays and fill in holes that are created by missing rays. Adaptive wavefront reconstruction is described in more detail with reference to FIG. 3.

Figure 3:
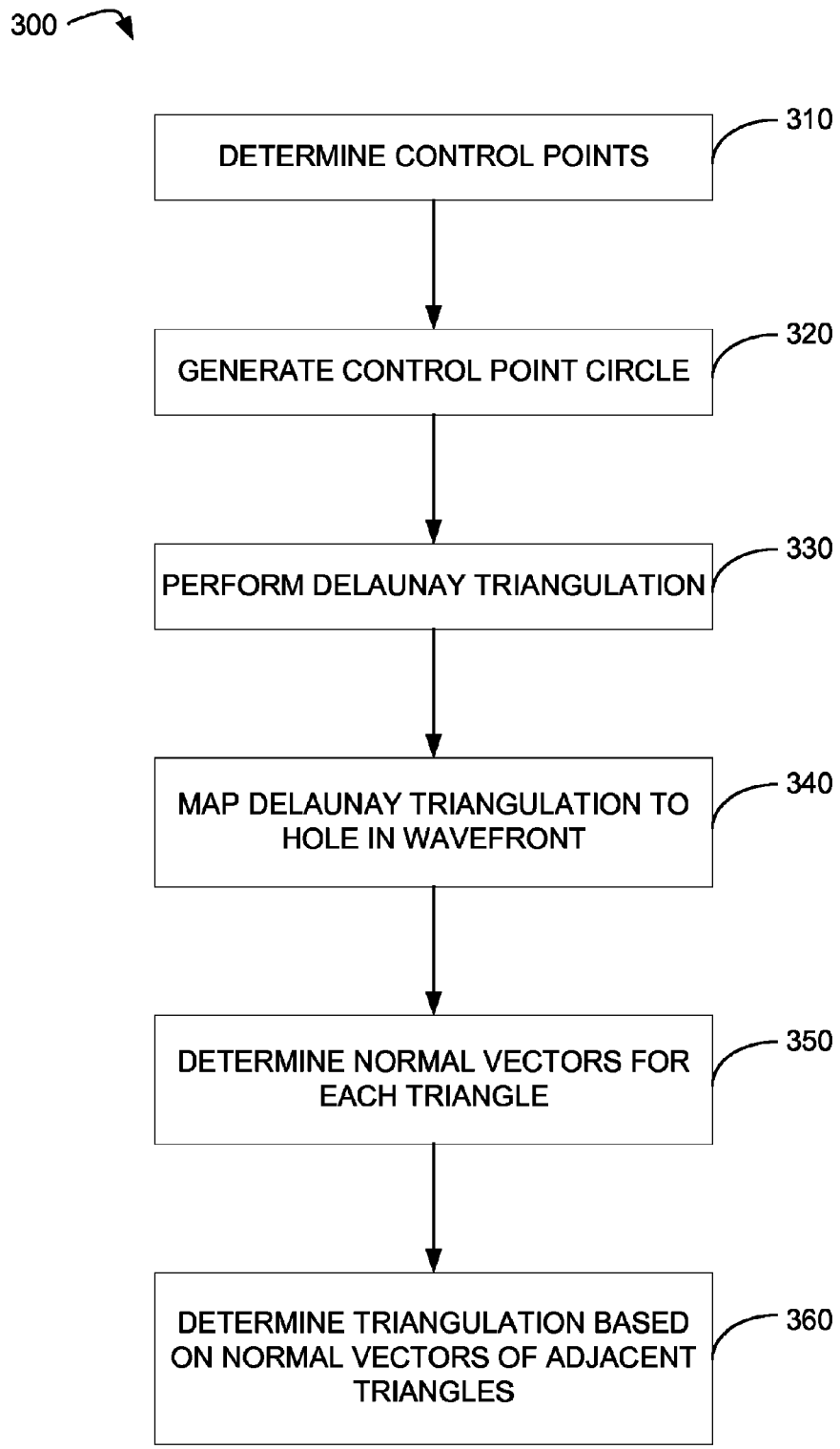
FIG. 3 illustrates a flowchart of a method for adaptive wavefront reconstruction according to implementations described herein.
Figure 4A:
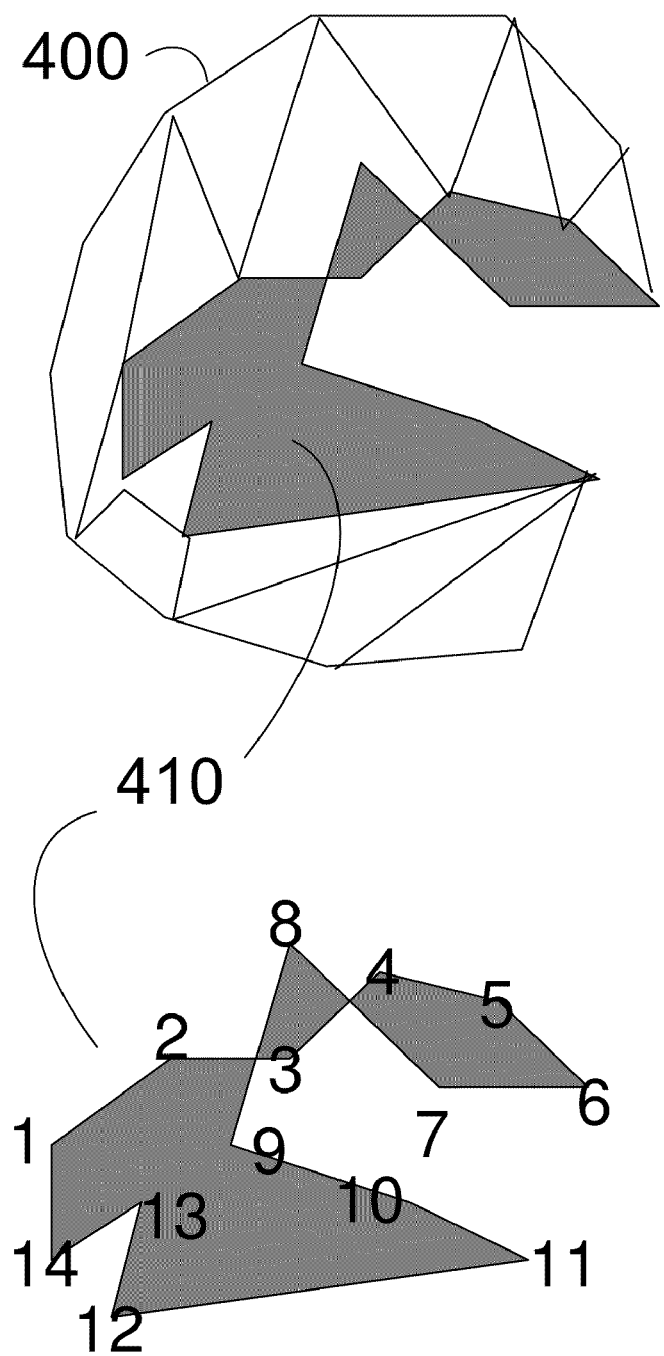
FIG. 4A illustrates a reconstructed wavefront having a hole in accordance with implementations described herein.
Figure 4B:
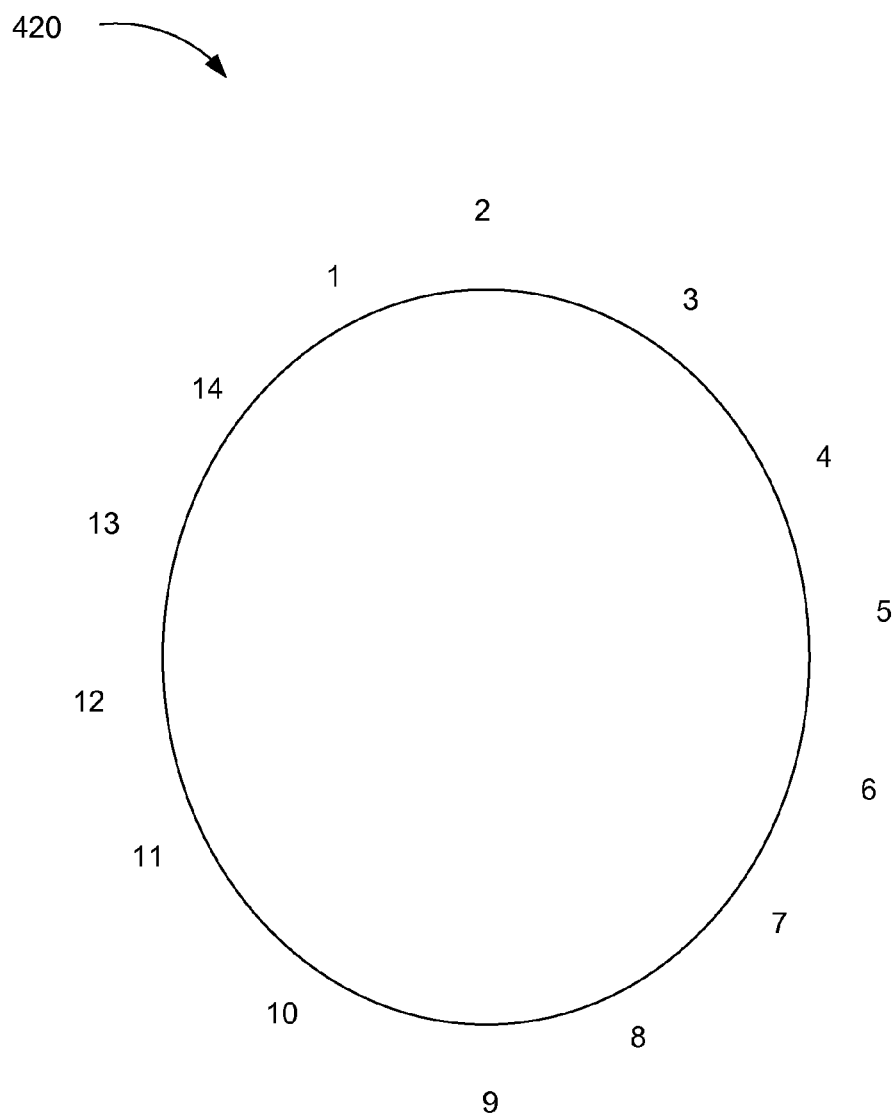
FIG. 4B illustrates a control point circle with points corresponding to a seismic wavefront hole in accordance with implementations described herein.
Figure 4C:
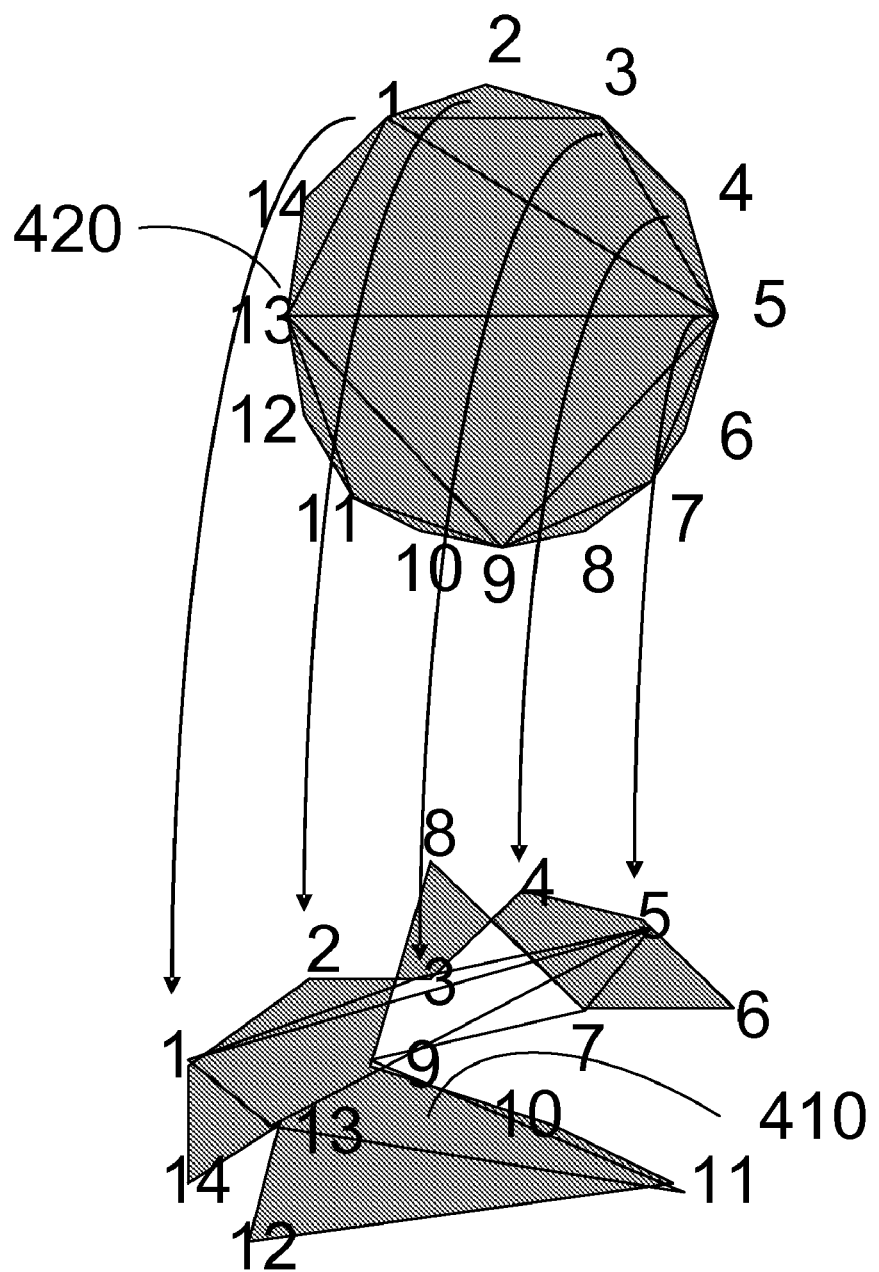
FIG. 4C illustrates a mapping of a Delaunay triangulation from a control point circle to a wavefront hole in accordance with implementations described herein.
Figure 4D:
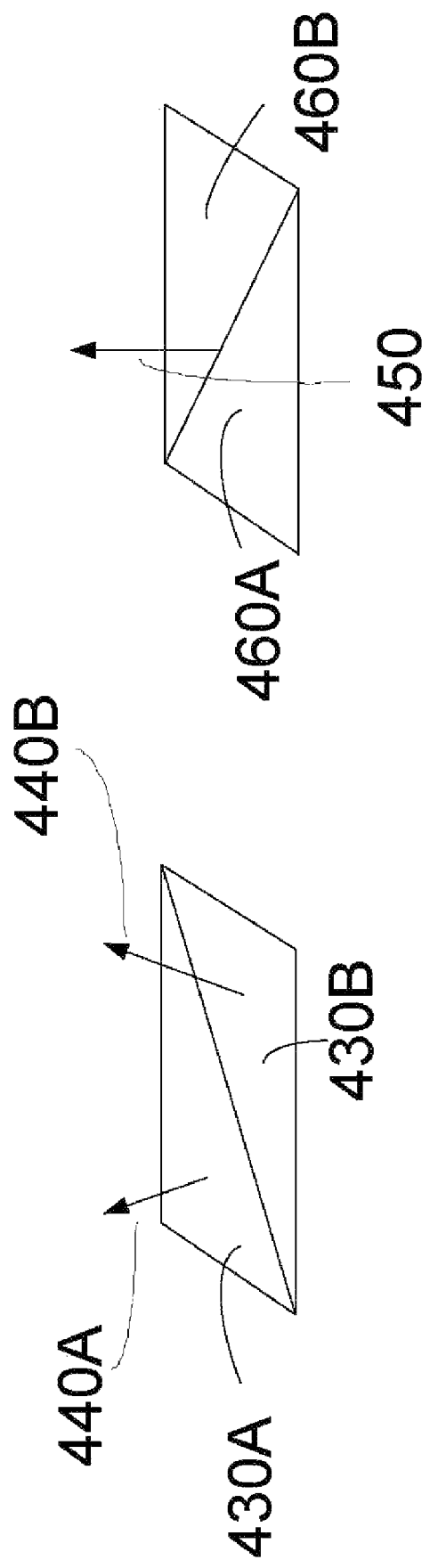
FIG. 4D illustrates a new triangulation of adjacent triangles on the reconstructed wavefront in accordance with implementations described herein.

FIG. 3 illustrates a flowchart of a method 300 for adaptive wavefront reconstruction according to implementations described herein. It should be understood that while the operational flow diagram indicates a particular order of execution of the operations, in some implementations, certain portions of the operations might be executed in a different order. Method 300 will be described with reference to FIG. 4A, which illustrates a reconstructed wavefront having a hole in accordance with implementations described herein; FIG. 4B, which illustrates a control point circle with points corresponding to a seismic wavefront hole in accordance with implementations described herein; FIG. 4C, which illustrates a mapping of a Delaunay triangulation from a control point circle to a wavefront hole in accordance with implementations described herein; FIG. 4D, which illustrates a new triangulation of adjacent triangles on the reconstructed wavefront in accordance with implementations described herein; and FIG. 4E, which illustrates a new triangulation of the reconstructed wavefront in accordance with implementations described herein.

At step 310, the control points defining the hole in the second seismic wavefront may be determined. An example of this step is illustrated in FIG. 4A, which shows a second seismic wavefront 400 having a hole 410 associated with one or more missing rays. In this example, the control points surrounding the hole 410 are represented by references 1-14.

Referring back to FIG. 3, at step 320, a circle 420 may be generated that has the control points 1-14 defining the hole 410. Herein, the circle 420 is also referred to as the control point circle. FIG. 4B illustrates the control point circle 420. In one implementation, each of the control points 1-14 may be equidistant along the circumference of the circle 420.

At step 330, the control points 1-14 may be triangulated, forming a set of triangles on the circle 420. An example of the triangles formed by a triangulation is shown in FIG. 4C. In one implementation, a Delaunay triangulation may be performed on the circle 420 for the control points 1-14.

Typically, when a hole develops in the wavefront, the hole may be complex and irregular. The hole may need to be filled with a triangulated surface, i.e., the triangles may span the entire area of the hole.

At step 340, the triangles formed by the Delaunay triangulation on the circle 420 may be mapped to the hole 410 in the second seismic wavefront 400. In other words, each triangle formed by a set of control points on the circle 420 is mapped to a triangle with the same control points to patch the hole 410.

FIG. 4C illustrates the mapping of the Delaunay triangulation from the control point circle 420 to the wavefront hole 410 in accordance with implementations described herein. For example, a triangle between control points 1, 5, and 13 on the circle 420 may be mapped to a triangle between control points 1, 5, and 13 on the hole 410.

The triangulated surface that fills the hole may not satisfy the Delaunay criteria and may need re-triangulation. Normal vectors may need to be used on pairs of adjacent triangles to decide which triangulated surfaces to modify. Several iterations might be needed until the Delaunay criteria are satisfied.

Accordingly, at step 350, normal vectors for each of the triangles on the hole 410 may be determined. The normal vector for a triangle is a vector that is normal to the surface of the triangle.

At step 360, a new triangulation of the hole 410 is determined based on the normal vectors of each of the triangles on the hole 410. More specifically, each pair of adjacent triangles on the hole 410 may be determined. Then, for each pair of adjacent triangles on the hole 410, an average vector may be determined based on the normal vectors of the adjacent triangles. The average vector may be the average of the two normal vectors associated with the adjacent triangles. The new triangulation may be based on the average vector.

Figure 4E:
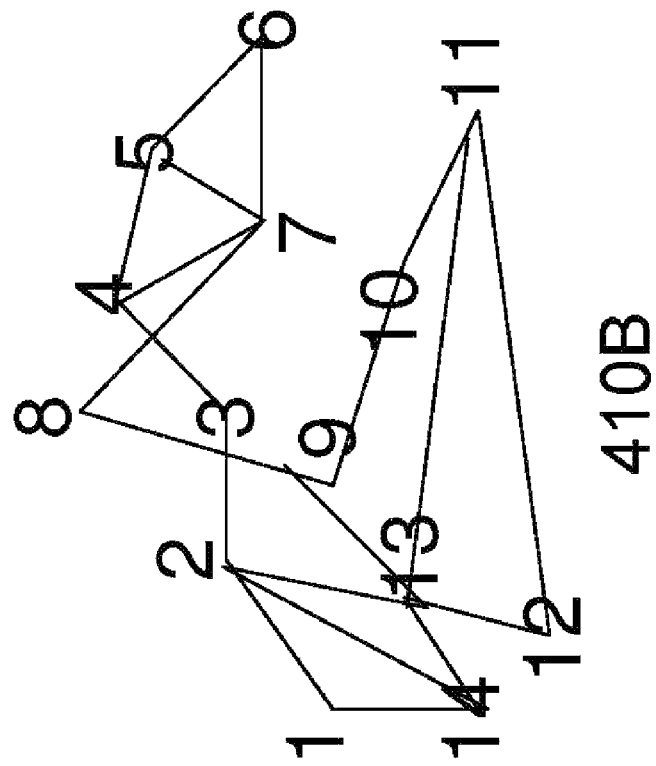
FIG. 4E illustrates a new triangulation of the reconstructed wavefront in accordance with implementations described herein.
Figure 4E:
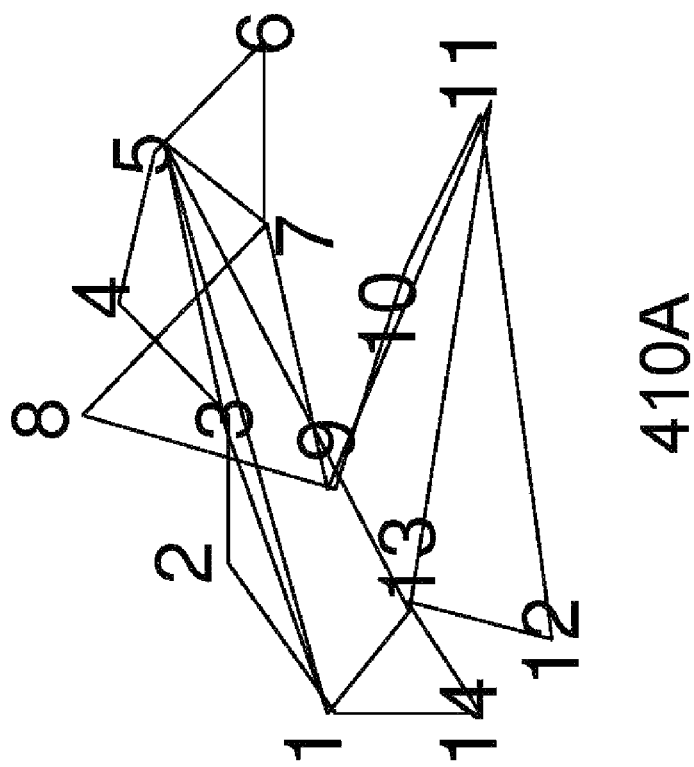

For example, referring to FIG. 4D, two adjacent triangles 430A and 430B are shown along with their respective normal vectors 440A and 440B. A new triangulation may be determined based on the average vector 450. FIG. 4E illustrates the new triangulation (triangles 460A and 460B) based on the average vector 450. Accordingly, triangulation 410A may represent the Delaunay triangulation and triangulation 410B may represent the new triangulation based on the normal vectors.

Advantageously, adaptive wavefront construction may be done for a configuration of shots, independent of any particular hydrophone/geophone configuration. For every shot in a shot configuration, a wavefront may be propagated down into the subsurface 108, reflected at a target reflector, such as boundaries 106, 107, and back to the surface to obtain the energy distribution arriving at the receivers 104. In one implementation, this energy distribution may be visualized as a map. A hydrophone/geophone configuration may then be determined by the placement of geophones/hydrophones where energy is the strongest, avoiding locations with weak or no energy.

Figure 5:
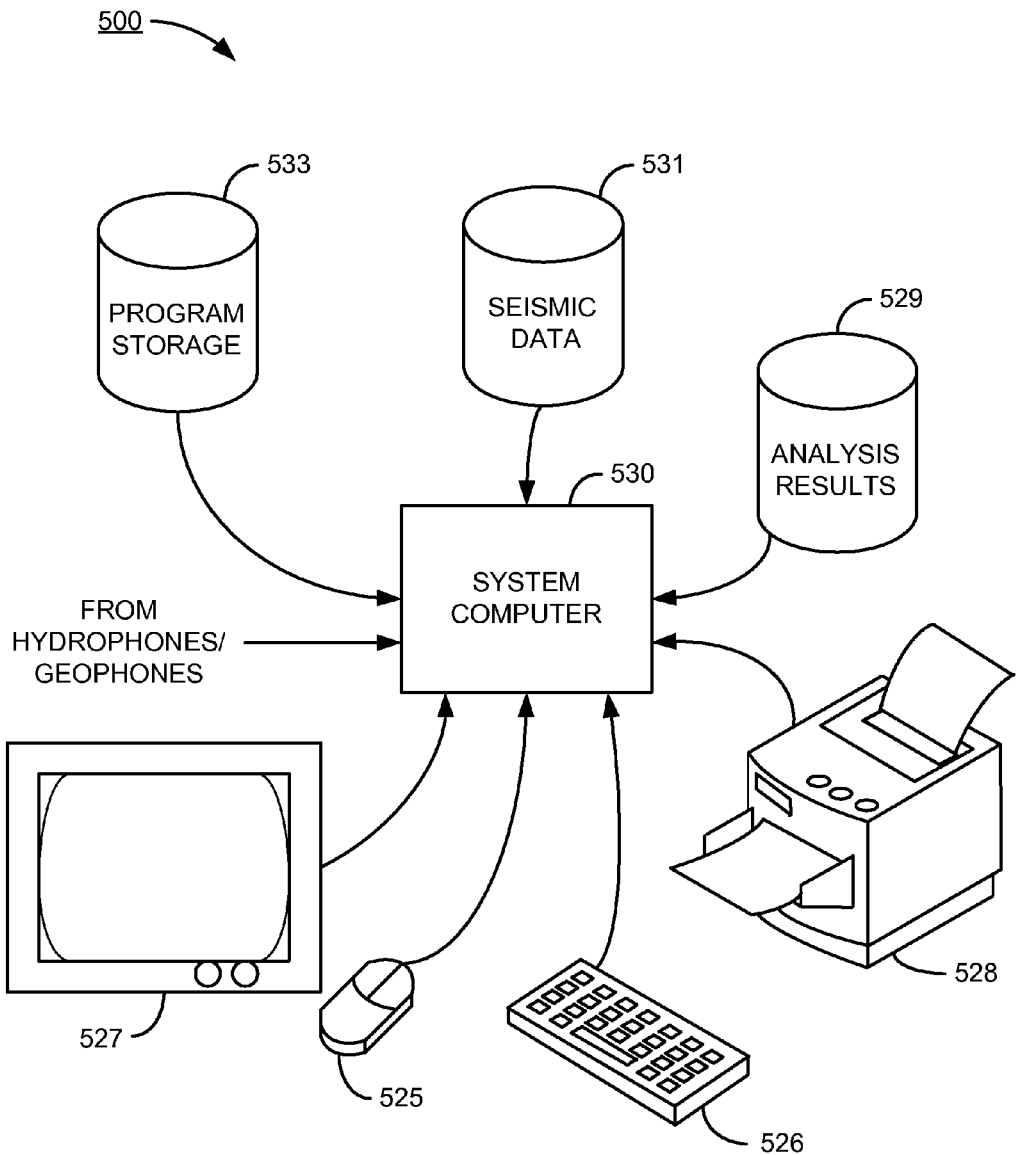
FIG. 5 illustrates a computer network into which implementations of various technologies described herein may be implemented.

FIG. 5 illustrates a computing system 500, into which implementations of various technologies described herein may be implemented. The computing system 500 may include one or more system computers 530, which may be implemented as any conventional personal computer or server. However, those skilled in the art will appreciate that implementations of various technologies described herein may be practiced in other computer system configurations, including hypertext transfer protocol (HTTP) servers, handheld devices, multiprocessor systems, microprocessor-based or programmable consumer electronics, network PCs, minicomputers, mainframe computers, and the like.

The system computer 530 may be in communication with disk storage devices 529, 531, and 533, which may be external hard disk storage devices. It is contemplated that disk storage devices 529, 531, and 533 are conventional hard disk drives, and as such, will be implemented by way of a local area network or by remote access. Of course, while disk storage devices 529, 531, and 533 are illustrated as separate devices, a single disk storage device may be used to store any and all of the program instructions, measurement data, and results as desired.

In one implementation, seismic data from the receivers may be stored in disk storage device 531. The system computer 530 may retrieve the appropriate data from the disk storage device 531 to process seismic data according to program instructions that correspond to implementations of various technologies described herein. The program instructions may be written in a computer programming language, such as C++, Java and the like.

The program instructions may be stored in a computer-readable medium, such as program disk storage device 533. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 530.

Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

In one implementation, the system computer 530 may present output primarily onto graphics display 527, or alternatively via printer 528. The system computer 530 may store the results of the methods described above on disk storage 529, for later use and further analysis. The keyboard 526 and the pointing device (e.g., a mouse, trackball, or the like) 525 may be provided with the system computer 530 to enable interactive operation.

The system computer 530 may be located at a data center remote from the survey region. The system computer 530 may be in communication with the receivers (either directly or via a recording unit, not shown), to receive signals indicative of the reflected seismic energy. These signals, after conventional formatting and other initial processing, may be stored by the system computer 530 as digital data in the disk storage 531 for subsequent retrieval and processing in the manner described above.

While FIG. 5 illustrates the disk storage 531 as directly connected to the system computer 530, it is also contemplated that the disk storage device 531 may be accessible through a local area network or by remote access. Furthermore, while disk storage devices 529, 531 are illustrated as separate devices for storing input seismic data and analysis results, the disk storage devices 529, 531 may be implemented within a single disk drive (either together with or separately from program disk storage device 533), or in any other conventional manner as will be fully understood by one of skill in the art having reference to this specification.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method, comprising:
generating a plurality of rays in a velocity model of the earth by performing a ray tracing on a subsurface area of the earth in the velocity model;
constructing a first seismic wavefront by triangulating a first plurality of control points that correspond to the plurality of rays, each control point representing an end point of a ray at the first seismic wavefront;
propagating the plurality of rays to a second seismic wavefront having a hole created by at least one missing ray at the second seismic wavefront;
filling the hole with a triangulated surface;
determining an energy distribution at the second seismic wavefront; and
determining a seismic acquisition configuration for the subsurface area of the earth based at least in part on the energy distribution.

2. The computer implemented method of claim 1, wherein filling the hole comprises:
defining a plurality of points on a circle that defines the boundary of the hole;
triangulating the plurality of points on the circle using Delaunay triangulation, thereby forming a plurality of triangles within the circle.

3. The computer implemented method of claim 2, wherein the plurality of points is equidistant along the circle.

4. The computer implemented method of claim 2, wherein filling the hole further comprises:
mapping the plurality of triangles to the hole;
determining a normal vector for each triangle of the hole;
determining two adjacent triangles of the hole;
determining an average vector of the normal vectors of the two adjacent triangles; and
triangulating a portion of the boundary of the hole that corresponds to the two adjacent triangles based on the average vector.

5. The computer implemented method of claim 4, wherein the normal vector for each triangle of the hole is a vector that is perpendicular to a surface of each triangle.

6. The computer implemented method of claim 4, wherein the portion of the boundary of the hole is triangulated using Delaunay triangulation.

7. A computer-readable non-transitory medium having stored thereon computer-executable instructions which, when executed by a computer, cause the computer to:
generate a plurality of rays in a velocity model of the earth by performing a ray tracing on a subsurface area of the earth in the velocity model;
construct a first seismic wavefront by triangulating a first plurality of control points that correspond to the plurality of rays, each control point representing an end point of a ray at the first seismic wavefront;
propagate the plurality of rays to a second seismic wavefront having a hole created by a missing ray at the second seismic wavefront;
fill the hole with a triangulated surface; and
refine the velocity model based on the second seismic wavefront.

8. The computer-readable non-transitory medium of claim 7, wherein the computer-executable instructions configured to fill the hole comprises computer-executable instructions configured to:
define a plurality of points on a circle that defines the boundary of the hole; and
triangulate the plurality of points on the circle using Delaunay triangulation, thereby forming a plurality of triangles within the circle.

9. The computer-readable non-transitory medium of claim 7, wherein the computer-executable instructions configured to fill the hole comprises computer-executable instructions which, when executed by a computer, cause the computer to:
map the plurality of triangles to the hole;
determine a normal vector for each triangle of the hole;
determine two adjacent triangles of the hole;

determine an average vector of the normal vectors of the two adjacent triangles; and triangulate a portion of the boundary of the hole that corresponds to the two adjacent triangles based on the average vector.

10. The computer-readable non-transitory medium of claim 9, wherein the normal vector for each triangle of the hole is a vector that is perpendicular to a surface of each of the two adjacent triangles.

11. The computer-readable non-transitory medium of claim 9, wherein the portion of the boundary of the hole is triangulated using Delaunay triangulation.

12. The computer-readable non-transitory medium of claim 7, wherein the plurality of points disposed on the circle are equidistant along the circle.

13. A computer system, comprising:
a processor; and
a memory comprising program instructions executable by the processor to:
generate a plurality of rays in a velocity model of the earth by performing a ray tracing on a subsurface area of the earth in the velocity model;
construct a first seismic wavefront by triangulating a first plurality of control points that correspond to the plurality of rays, each control point representing an end point of a ray at the first seismic wavefront;
propagate the plurality of rays to a second seismic wavefront having a hole created by a missing ray at the second seismic wavefront;
fill the hole with a triangulated surface; and
refine the velocity model based on the second seismic wavefront.

14. The computer system of claim 13, wherein the program instructions executable by the processor to fill the hole comprises program instructions configured to:

define a plurality of points on a circle that defines the boundary of the hole; and triangulate the plurality of points on the circle using Delaunay triangulation, thereby forming a plurality of triangles within the circle.

15. The method of claim 1, wherein determining the seismic acquisition configuration comprises placing seismic receivers where the energy is the strongest.

16. The method of claim 1, wherein determining the energy distribution comprises visualizing the energy distribution as a map.

17. The computer-readable non-transitory medium of claim 7, further comprising computer-executable instructions which, when executed by a computer, cause the computer to derive one or more images of the subsurface area using the refined velocity model.

18. The computer system of claim 14, wherein the program instructions executable by the processor to fill the hole further comprises program instructions configured to:
map the plurality of triangles to the hole;
determine a normal vector for each triangle of the hole, wherein the normal vector is a vector that is perpendicular to a surface of a triangle;
determine two adjacent triangles of the hole;
determine an average vector of the normal vectors of the two adjacent triangles; and
triangulate a portion of the boundary of the hole that corresponds to the two adjacent triangles based on the average vector.

19. The computer system of claim 13, wherein the memory further comprises program instructions executable by the processor to derive one or more images of the subsurface area using the refined velocity model.

* * * * *